Jan. 2, 1934.  J. SQUIRES  1,942,222
METHOD OF MAKING PROPELLER BLADES
Filed March 11, 1931
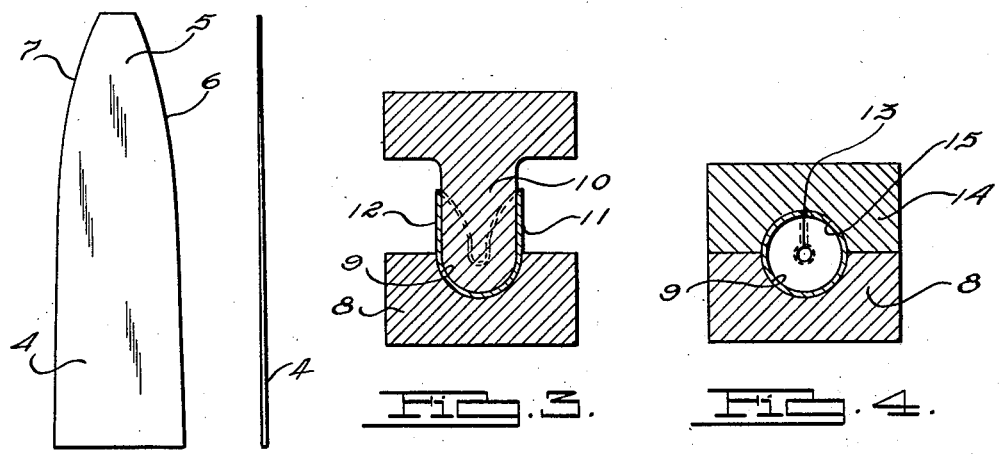
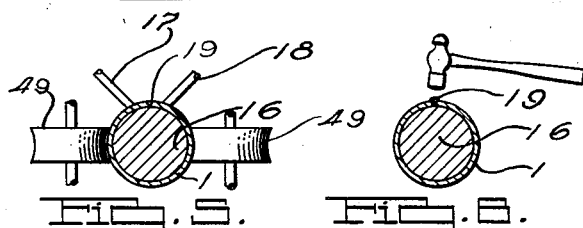
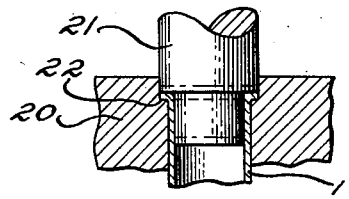
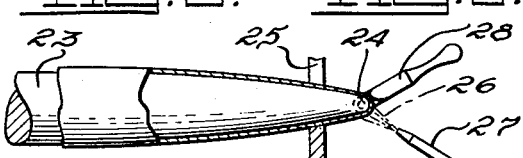
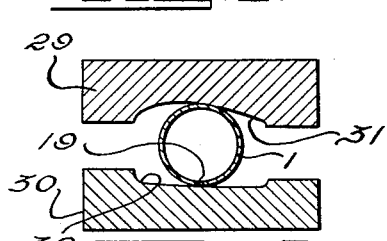
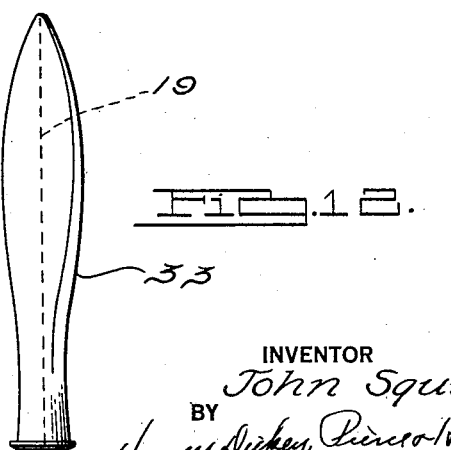
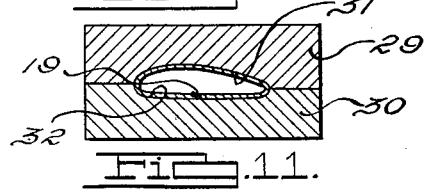
INVENTOR
*John Squires.*
BY
*Harness, Dickey, Pierce & Haun*
ATTORNEYS.

Patented Jan. 2, 1934

1,942,222

UNITED STATES PATENT OFFICE 1,942,222

METHOD OF MAKING PROPELLER BLADES

John Squires, Hagerstown, Md.

Application March 11, 1931. Serial No. 521,798

22 Claims. (Cl. 29—156.8)

This invention relates to propeller blades such as are employed in connection with propellers of aircraft and the like and particularly to an improved method of manufacturing propeller blades.

The main objects of the invention are to provide a method for forming a propeller blade from a sheet-like piece of stock of both non-uniform thickness and width; to provide a method of this kind in which the sheet-like piece of stock is initially formed into a substantially planular blank having non-uniform width and thickness which are substantially equal in dimensions, at successive cross-sections, to the inner perimeters and wall thicknesses, respectively, of corresponding sections of the finished product; to provide suitable operations in a method of this character for modifying the planular blank into a tubular blank of circular cross-section and non-uniform diameter, with the opposite edges of the planular blank in abutting relationship; and to provide for the formation of a generally tapered, tubular propeller blade blank from a piece of stock of the above contour so as to obviate the formation of wrinkles and other irregularities in the inner and outer surfaces of the blank by the gathering of metal during the forming operations heretofore required in bringing a cylindrical tube to tapered formation, and particularly to eliminate as much of the machining of both the internal and external sides of the blank as possible in bringing the blank to predetermined size, shape, tapering wall thickness and contour; to provide suitable welding operations for integrally securing the abutting edge portions together and closing the small end of the tubular blank respectively; and to provide steps in a method of this kind for working the ridges of metal that are normally formed on the inner and outer sides of the tube during welding of its seam, to the contour of the inner and outer peripheries, respectively, of the tube in a manner which improves the grain structure and texture of the metal and which obviates trimming of the seam on its internal and external sides.

Further objects of the invention are to provide an improved propeller blade forming method in which the large extremity of the tubular blank is deformed so as to provide a flange for securement to a propeller hub; and to provide a final die forming step in this improved method, in which the tubular blank is pressed to the desired cross-sectional contour with the welded seam thereof located in a position with respect to the dies that causes the seam to lie in a predetermined location in the ultimate blade at which minimum strain occurs.

An illustrative embodiment of the invention is shown in the accompanying drawing, in which:

Fig. 1 is a plan view of a substantially planular metal blank from which a tubular propeller blade blank is formed.

Fig. 2 is a side elevation of the blank showing the tapering thickness thereof.

Fig. 3 is a transverse section of a pair of die parts illustrating the initial forming operation to which the planular blank, or stock, is subjected in making the tubular propeller blade blank.

Fig. 4 is a transverse section of a pair of die parts illustrating the second forming operation involved in producing the tubular blank.

Fig. 5 is a transverse section of a tubular propeller blade blank which is supported on a mandrel, showing the manner in which the seam of the blank is welded.

Fig. 6 is a view like Fig. 5, illustrating one manner of working the excess metal of the seam into conformity with the outer and inner peripheries of the tubular blank.

Fig. 7 is a longitudinal vertical section of a tubular propeller blade blank from which the supporting mandrel has been removed.

Fig. 8 is a fragmentary section taken through the axis of the blank, shown in Fig. 7, and illustrating the step of deforming the large end of the blank to produce a securing flange.

Fig. 9 is a fragmentary vertical section similar to Fig. 7 but illustrating the closing of the end of the tube.

Fig. 10 is a fragmentary vertical section of a tubular blank showing the same positioned between a pair of dies in readiness for compression to final blade shape.

Fig. 11 is a view similar to Fig. 10, but showing the die parts brought together and illustrating the manner in which the cross sectional shape of the blank is modified by the dies.

Fig. 12 is a perspective view of a completed propeller blank illustrating the position in which the welded seam of the blade lies.

The initial step in the present method is to form a tubular blank from a flat sheet metal plate of suitably tapered thickness by rolling, bending or otherwise forming the plate to bring its side edges into contacting relationship, in which position they are secured together by welding. Obviously, the size, shape and contour of the desired tubular blank will determine the size, shape and contour of the plate from which it is to be formed, and similarly the size, shape and contour of the finished propeller blade will, in accordance with the present invention, predetermine the size, shape and contour of the tubular blank.

For the purpose of illustration let it be assumed, as a specific illustration of the present invention, that the shape and contour of the desired finished blade requires a tubular blank 1 (see Fig. 6) having a main body portion 2 of substantially cylindrical form, and an end portion 3 of inwardly tapered formation, the wall thickness of the tubular blank decreasing from its large end towards its small end. To form the particular tubular blank shown, in accordance with the present invention, a flat sheet metal blank 4, the thickness of which varies from one end thereof to the other, such as is indicated in Figs. 1 and 2 is provided. The contour of the side edges of this sheet, as well as the width thereof, is such that when the blank 4 is brought into tubular shape with the side edges thereof in contact, as in the manner hereinafter described, the resulting product will correspond to the size, shape and contour of the tubular blank desired. Both the widths and thicknesses of successive cross sections of the blank 4, from one end thereof to the other end thereof, are substantially equal to the circumferences of the inner peripheries and the wall thicknesses, respectively, of the corresponding cross sections of the tubular blank 1.

The planular blank 4 may be formed into a tube of the type shown in Fig. 7 in any suitable manner. In the method illustrated in the drawing, the stock 4 is placed upon a female die part 8 having a recess 9 of semi-circular cross section which corresponds to the contour of one-half of the tube 1 and the laterally intermediate portions of the stock are pressed into the recess by a male die part 10. The male die part 10 imparts to the central portion of the stock 4 which extends longitudinally thereof, the shape of the recess 9 and after the male die part is withdrawn the opposite side portions 11 and 12 of the stock are arcuately bent inwardly until the side edges of the stock abut each other in the manner shown at 13 in Fig. 4. This bending of the side portions 11 and 12 is conveniently accomplished by compressing the stock after it has been modified to the shape shown in Fig. 3, between the female die part 8 and a substantially identical female die part 14 having a recess 15 registering with and complementary to, the recess 9 of the die part 8.

This final forming of the stock to tubular shape may be performed with the aid of a mandrel (not shown) which conforms in size and contour to the internal size and contour of the desired blank. In this case the mandrel is seated in the trough of semi-circular cross-section which is produced by the male die part or punch 10 after the latter is removed and the die parts 8 and 14 are forcefully brought together so as to press all areas of the upstanding side portions 11 and 12 of the stock uniformly upon the outer surface of the mandrel and to bring the side edges of the stock into abutting relationship.

After the blank 4 has been formed into a hollow tube of tapering contour by the above operations or by any other method and suitable apparatus, a mandrel 16 is inserted into the resulting tube and the abutting edges of the stock are welded together while the tube is supported on the mandrel by an electric circuit or in any other convenient way. When the welding process, illustrated in Fig. 5 is employed, electrodes 17 and 18 of an electric circuit (not shown) are applied to the respectively opposite sides of the seam of the blank while the blank is passed between rollers 49. The electrical resistance of the metal brings the abutting edges of the seam to a welding temperature and the rollers 49 force the edges together. The edges of the stock are fused together and the fused metal fills in any gap which may have existed therebetween forming a welded seam 19. Other apparatus may, of course, be employed for carrying out the same type of welding operation, it being understood that I prefer to employ the type of welding and apparatus shown merely because I have found that a more perfect product generally results, but it is to be understood that other welding methods and apparatus may be employed where desired.

During the welding operation a substantial amount of excess metal normally collects along the exterior side of the seam 19, forming a ridge which protrudes beyond the outer periphery of the tube 1. This ridge is preferably worked by hammering, as illustrated in Fig. 6, or in any other suitable manner, as for example by swaging, into conformity with the outer periphery of the tube. The working of the metal, in this manner, reduces the thickness of the seam to the thickness of the wall of the tube 1 and also produces an improved texture and grain structure of the metal and at the same time eliminates the necessity of machining or otherwise trimming the seam to the thickness of the wall of the tube.

The tube or blank 1 is then placed in a suitable die such as indicated at 20 in Fig. 8 and is operated upon by a plunger 21 or other suitable apparatus so as to deform the large end of the blank to provide thereon a radially extending flange 22 which is used in securing a propeller blade to a propeller hub.

In cases where the above operations have not resulted in a blank having a bore sufficiently accurate in size, shape and contour for the purpose thereafter required of it, then such bore may be brought into conformance with a desired standard as follows. The tube 1 may or may not, as desires or necessities dictate, be brought to a suitable temperature, and the mandrel 16 be replaced by a slightly larger one whose exterior surface conforms in size, shape and contour to the size, shape and contour of the interior surface of a desired predetermined standard tubular blank. This mandrel is then forced into the tubular blank, expanding it radially and stretching it longitudinally beyond the elastic limit of its material, whereby to permanently distort it into the desired form.

The blank is next put on a mandrel 23, shown in Fig. 9, which conforms to the internal size, shape and contour of the blank 1 but which has a rounded small end 24 that is located slightly inwardly from the small end of the blank. The mandrel 23 is mounted in a lathe or other suitable apparatus with the small end of the mandrel and blank supported on a steady-rest 25 and the blank and mandrel are rotated.

A flame 26 from an acetylene or other heating torch 27 is then directed at the small projecting end of the blank 1 until the same is brought to a plastic or semi-plastic condition, and then the projecting end of the blank is spun around the end 24 of the mandrel 23 by a spinning tool 28. By this operation the small end of the blank 16 is closed and the metal is worked to a single point on the axis of the blank and any possible aperture that may otherwise occur at this point is closed by the metal welding into itself. Other methods may, in the broader aspects of the invention, be employed for closing the small end of the blank.

After the small end of the blank is closed, then the blank may be placed between suitable die parts 29 and 30, in the manner shown in Fig. 10, with the welded longitudinal seam 19 so located as to throw it into a predetermined location in the finished blade relative to the leading or the trailing edges thereof. As a means of illustration, I have shown the seam 19 as located in a vertical plane which passes through the central axis of the blank, and on that side thereof which will bring the seam into the center of the pressure face of the propeller, this being one location that I have found desirable in that it is liable to be subjected to a minimum strain in such location. The die parts 29 and 30 are provided with cooperating depressions 31 and 32, the perimeters of which at any particular cross-section of the dies, corresponds exactly to the perimeter of the blank 1 at that point. The die parts 29 and 30 are then brought together, preferably while maintaining the interior of the blank 1 under suitable pressure and in a heated condition, forming the blank to the blade shape, shown in Figs. 11 and 12. The seam 19 may, of course, be placed at any selected location in the blade by properly positioning it with respect to the die parts 29 and 30 before the latter are brought together.

By initially forming the tubular blank 1 of which the propeller blade is ultimately produced from a planular piece of stock which tapers in thickness toward the one extremity, the turning operations heretofore required in bringing the walls of the tubular blank to a predetermined tapered condition, are greatly reduced in all cases and may be completely eliminated in some instances, and it is not necessary in all cases to machine the inner and outer peripheries of the tube which then require only polishing by conventional means.

Formal changes may be made in the specific embodiment of the invention described without departing from the spirit and substance of the broad invention, the scope of which is commensurate with the appended claims.

I claim:

1. The method of making a propeller blade which consists in forming a planular metal blank of non-uniform width and thickness having predetermined dimensions, bending said planular blank into a tubular blank of non-uniform diameter and tapering wall thickness, with opposite side edges of the planular blank in abutting relationship, and changing the cross-sectional contour of said tubular blank to that desired in the finished product.

2. The method of making a propeller blade which consists in forming a planular metal blank of non-uniform width and thickness having predetermined dimensions, bending said planular blank to a tubular blank of non-uniform diameter and tapering wall thickness, with opposite side edges of the planular blank in abutting relationship, welding said abutting edges together, closing the small end of said tubular blank, and changing the cross-sectional contour of said tubular blank to that desired in the finished product.

3. The method of making a propeller blade which consists in forming a planular metal blank of non-uniform width and thickness having predetermined dimensions, bending said planular blank to a tubular blank of non-uniform diameter and tapering wall thickness, with opposite side edges of the planular blank in abutting relationship, forming a welded seam along said abutting edges, working the metal of said seam into conformity with the inner and outer peripheries of said tubular blank in a manner which improves the grain structure of said seam, and changing the cross-sectional contour of said tubular blank to that desired in the finished product.

4. The method of making a propeller blade blank which consists in forming a planular metal blank of non-uniform width and thickness having predetermined dimensions, bending said planular blank to a tubular blank of non-uniform diameter and tapering wall thickness, with opposite side edges of the planular blank in abutting relationship, forming a welded seam along said abutting edges and hammering the metal of said seam so as to improve its grain structure and to bring said seam into conformity with the inner and outer peripheries of said tubular blank and with the wall thickness thereof.

5. The method of making a tubular propeller blade blank which consists in first forming a substantially planular piece of stock having a non-uniform width and its thickness tapering generally toward one end thereof, bending said stock into a tube of non-uniform diameter and having a tapering wall thickness, with opposite side edges of the stock in abutting relationship, welding said side edges together, and closing the small end of said tubular structure.

6. The method of making a tubular propeller blade blank which consists in first forming a substantially planular piece of stock having a non-uniform width and its thickness tapering generally toward one end thereof, bending said stock into a tube of non-uniform diameter and of tapering wall thickness, with opposite side edges of the stock in abutting relationship, forming a welded seam along said abutting edges, hammering the metal of said seam so as to improve its grain structure and to simultaneously work said seam into conformity with the inner and outer peripheries of said tubular structure, and closing the small end of said tubular structure.

7. The method of making a propeller blade from a sheet-like piece of stock having a tapering thickness and a main portion and end portion of gradually and radically tapering widths respectively, which consists in bending said stock longitudinally into a tubular blank having a tapering wall thickness and a main portion and an end portion of gradually and radically tapering formations respectively with the side edges of said stock in abutting relationship, welding said abutting edges of said stock together, and modifying the cross-sectional contour of said blank to the cross-sectional contour desired in the finished product.

8. The method of making a propeller blade from a sheet-like piece of stock paper having a tapering thickness and non-uniform width, which consists in bending said stock longitudinally into a tubular blank having a tapering wall thickness and of non-uniform diameter, with the side edges of said stock in abutting relationship, welding the abutting edges of said stock together, and modifying the cross-sectional contour of said blank to the cross-sectional contour desired in the finished product, with the welded edges in a predetermined position in said blade.

9. The method of making a propeller blade from a sheet-like piece of stock having a tapering thickness and a main portion and end portion of gradually and radically tapering widths, respectively, which consists in bending said stock longitudinally into a tubular blank having a tapering wall thickness and a main portion and an end portion of gradually and radically tapering formations respectively with the said edges of said stock in abutting relationship, welding the abutting edges of said stock together, hammering the excess metal at the welded edge portions of said stock into conformity with the periphery of said tubular blank, and modifying the cross-sectional contour of said blank to the cross-sectional contour desired in the finished product.

10. The method of making a propeller blade from a sheet-like piece of stock having a tapering thickness and non-uniform width, which consists in bending said stock longitudinally into a tubular blank having a tapering wall thickness and non-uniform diameter, with the side edges of said stock in abutting relationship, welding the abutting edges of said stock together, hammering the excess metal at the welded edge portions into conformity with the periphery of said tubular blank, and modifying the cross-sectional contour of said blank between die parts with the line of weld thereof located at the leading edge forming portions of said dies so as to bring the blank to the desired finished contour with the welded edges extending approximately centrally of one of the faces of the blade.

11. The method of making a propeller blade which consists in first forming a sheet-like piece of metal stock having different widths and thicknesses at successive cross sections substantially equal respectively to the inner peripheries and wall thicknesses desired at corresponding cross sections of the finished product, bending said stock longitudinally into a tapered blank of tubular formation, and modifying the cross-sectional contour of said tubular blank to the contour desired in the finished product.

12. The method of making a tapered propeller blade which consists in first forming a piece of metal stock having widths and thicknesses at successive cross sections substantially equal respectively to the inner peripheries and wall thicknesses desired at corresponding cross sections of the finished product, bending said stock longitudinally into a tapered blank of tubular formation with the side edges of said stock in abutting relationship, welding said side edges together, closing the small end of said tubular blank, and changing the cross-sectional contour of said tubular blank to that desired in the finished product.

13. The method of making a tapered propeller blade blank having varying wall thickness from a sheet-like piece of stock having different widths and different thicknesses at successive sections equal to the desired inner peripheral circumference and wall thicknesses of corresponding sections in the blank, which consists in modifying said stock to tapered tubular formation with the side edges thereof in abutting relationship, welding said side edges together, and closing the small end of the tubular structure.

14. The method of making a tapered propeller blade blank having varying wall thickness from a sheet-like piece of stock having different widths and different thicknesses at successive sections equal to the desired inner peripheral circumference and wall thicknesses of corresponding sections in the blank, which consists in modifying said stock to tapered tubular formation with the side edges thereof in abutting relationship, welding said side edges together, hammering the excess metal at said welded edges so as to improve the grain structure thereof and to bring the welded portion of the tubular structure to the wall thickness thereof, and closing the small end of the tubular structure.

15. A propeller blade blank including a planular sheet-like piece of metal stock having width and thickness tapering toward one end, at least a portion of said width tapering along a curved line, said width tapering symmetrically relative to the longitudinal center line thereof, the widths and thicknesses of said blank at successive transverse cross sections being substantially equal to the inner peripheries and wall thicknesses respectively of corresponding sections of a desired blade.

16. The method of making a propeller blade which consists in first forming a planular piece of metal stock having different thicknesses at successive cross-sections substantially equal to the wall thicknesses desired at corresponding cross-sections of the finished product, bending said stock into a blank of tubular formation with the edges of said stock in abutting relationship, fixing said edges together, and then modifying the cross-sectional contour of said tubular blank by compression between dies to the contour desired in the finished product.

17. The method of making a tubular propeller blade blank from a sheet-like piece of stock having a tapering thickness and a main portion and end portion of gradually and radically tapering widths respectively, which consists in bending said stock longitudinally into the form of a tube having a tapering wall thickness and a main portion and an end portion of gradually and radically tapering formations respectively with the side edges of said stock in abutting relationship, and welding said abutting edges of said stock together.

18. The method of making a tubular propeller blade blank which consists in first forming a sheet-like piece of metal stock having different widths and thicknesses at successive cross-sections substantially equal respectively to the inner peripheries and wall thicknesses desired at corresponding cross-sections of a propeller blade, at least a portion of the side edges of said sheet tapering symmetrically relative to the longitudinal center line along a curved path, and bending said stock longitudinally into a tapered tube.

19. The method of making a propeller blade which consists in first forming a substantially planular piece of stock having its thickness tapering toward one end, forming said stock into a tapered tubular formation having a tapering wall thickness with opposite edge portions of said stock adjacent each other forming a welded seam along said adjacent edges, hammering the metal of said seam so as to improve its grain structure and to simultaneously work said seam into conformity with the inner and outer peripheries of said tubular structure, closing the small end of said tubular structure, and changing the cross-sectional contour of said tubular structure to that desired in the finished product.

20. The method of making a tubular propeller blade blank which consists in first forming a substantially planular piece of stock having its thickness and width tapering toward one end, bending said stock into a tapered tubular formation having a tapering wall thickness and with opposite edges of the stock in adjacent relationship, fixing said edges together, closing the small end of said tubular structure, and forming an outwardly extending flange on the opposite end of said tubular structure.

21. The method of making a propeller blade which consists in forming a planular metal blank of tapering width and thickness, having predetermined dimensions, bending said planular blank into a tubular blank of tapering formation having a tapering wall thickness with opposite side edges of the planular blank in abutting relationship, fixing said side edges together, upsetting a flange on the large end of said tubular blank, and changing the cross-sectional contour of said tubular blank to that desired in the finished product.

22. The method of making a propeller blade from a sheet-like piece of stock having a tapering thickness and a main portion and end portion of gradually and radically tapering widths, respectively, which consists in bending said stock longitudinally into a tubular blank having a tapering wall thickness and a main portion and an end portion of gradually and radically tapering formations respectively with the said edges of said stock in adjacent relationship, permanently fixing the adjacent edges closing the small end of said tubular blank, forming an outwardly extending flange on the opposite end thereof, and modifying the cross-sectional contour of said blank to the cross-sectional contour desired in the finished product.

JOHN SQUIRES.